F. W. NORTON.
AUTOMOBILE CONTROLLING DEVICE.
APPLICATION FILED JULY 21, 1919.
1,336,856. Patented Apr. 13, 1920.
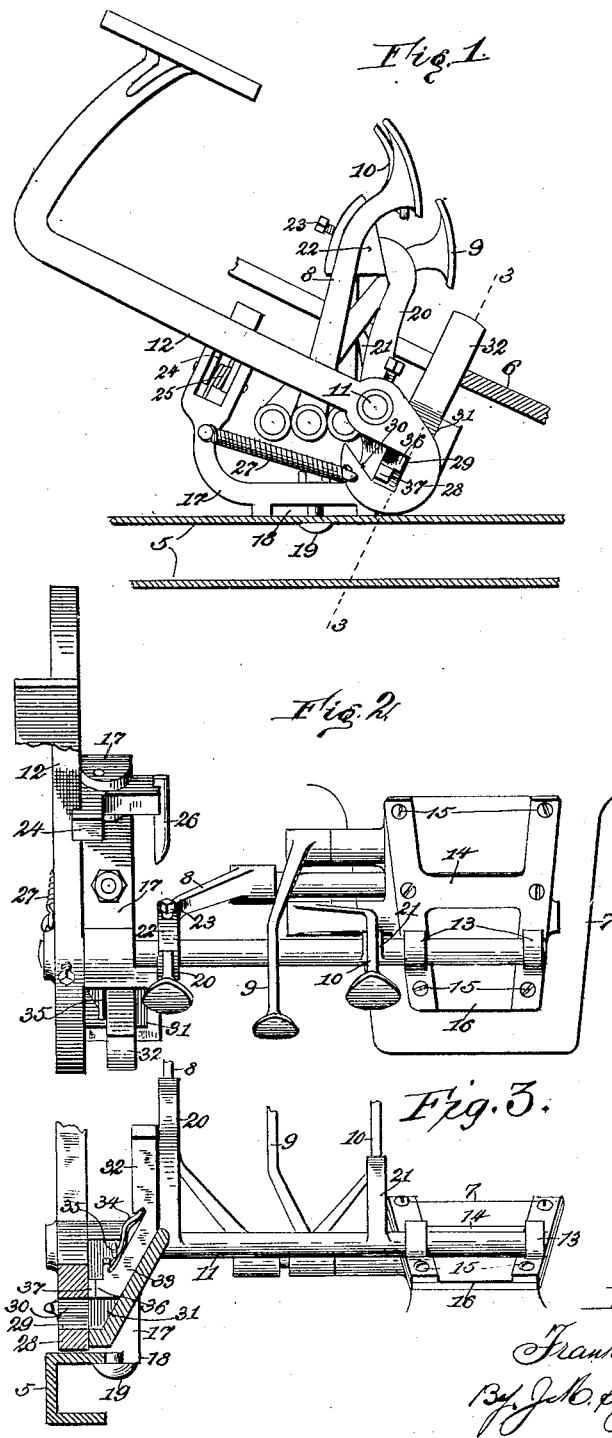
Inventor
Frank W. Norton
By J. M. St. John, Atty.

UNITED STATES PATENT OFFICE.

FRANK W. NORTON, OF MINNEAPOLIS, MINNESOTA.

AUTOMOBILE-CONTROLLING DEVICE.

1,336,856.  Specification of Letters Patent.  Patented Apr. 13, 1920.

Application filed July 21, 1919. Serial No. 312,210.

*To all whom it may concern:*

Be it known that I, FRANK W. NORTON, a citizen of the United States, residing at Minneapolis, in the county of Hennepin and State of Minnesota, have invented certain new and useful Improvements in Automobile-Controlling Devices; and I do hereby declare the following to be a full, clear, and exact description of the invention, such as will enable others skilled in the art to which it appertains to make and use the same.

This invention relates to the control of motor vehicles, and more particularly the Ford automobile; the object of the invention being to provide means for easily throwing the transmission mechanism to the neutral position, and from that to the dead-stop, brake-applied position without stalling the engine.

A further object is to provide for locking this control mechanism in the neutral position, and for releasing the lock by the natural action of the clutch-pedal.

Another object is to provide for locking the control mechanism in the neutral position, regardless of the action of the clutch-pedal, so as to enable the operator to back the car, or operate it at low speed, in emergencies, or in restricted places, without the danger of inadvertently clutching in the high-speed gear and giving the car a sudden start forward.

Such other objects as are contemplated in the invention will fully appear in the description following.

In the case of some automobiles, particularly the Ford car, a planetary transmission is employed, and by the pressure of various brake-bands in the transmission mechanism, by foot-levers the operation of the car is controlled. In the Ford car, for example, the normal position of the clutch pedal is its extreme rearward position, and this is also its position when running in high gear, the hand-lever being in proper position. When the clutch pedal is pushed forward about midway of its stroke, a neutral, disengaged position is reached. When the same pedal is pushed well forward, the low gear is engaged, and this is the position, of course, for starting the car. When well under way, the pedal is gradually released, and automatically takes the high-gear position. Another pedal applies the brake, and by another pedal the reverse-gear is engaged for backing the car.

From the nature of the case, it will be evident that in an emergency, in a crowded thoroughfare, it is a very natural impulse of the driver, and especially if a woman, to give the clutch-pedal a sudden forward push to disengage the high gear. In so doing it is very easy to overdo the stroke, and throw in the low gear at the same time that the other foot throws on the brake, or in the confusion of the moment, apply the brake too soon. The effect in either case is to stall the engine. This invention is designed to prevent such a difficulty, as well as others that will be more particularly set forth hereafter.

In the accompanying drawing, forming a part of this specification, Figure 1 is a side elevation of mechanism embodying my invention. Fig. 2 is a plan view of the same as seen from above. Fig. 3 is a rear view of the same, a part being in section on the line 3—3 of Fig. 1.

In the drawing, the numeral 5 denotes a chassis frame sill, and 6 the foot-board of an automobile body. Under the foot-board, but not shown in Fig. 1, is the transmission case 7. From this project certain rock-shafts carrying respectively the clutch-pedal 8, reverse pedal 9, and brake-pedal 10. All these parts are of standard and familiar construction.

A little behind these pedal rock-shafts is mounted an auxiliary rock-shaft 11, to one end of which (the left, as regards the driver of the car), is attached an auxiliary pedal 12. The right hand end of the rock-shaft is mounted in a pair of bearings 13, forming parts of a single plate 14 fitting on top of the transmission case. This plate is drilled so as to register with the screws 15 which hold the top-plate 16 of the transmission case in position. To install the auxiliary rock-shaft it is therefore only necessary to remove these screws, set the bearing-plate in position, and replace the screws through the holes in the bearing-plate. The rock-shaft is then in correct alinement for the attachment to the sill 5 of the left-end bearing 17. This has a foot 18 depending to the level of the under side of the upper web of the sill, and serves as an abutment for one side of the head of a bolt 19 by which the bearing is securely clamped to the sill, as shown in Figs. 1 and 3. The appliance may thus be installed without the boring of a hole in metal, and in a very few minutes.

Projecting from the upper side of the rock-shaft, and preferably integral parts of it, are short arms 20 and 21 in alinement with the clutch-pedal and the brake-pedal, respectively. The former is considerably longer than the latter, and is designed to impart a relatively longer stroke to the clutch-pedal than is given to the brake-pedal. This effect is still further augmented by providing an inclined cam 22, herein shown as attached to the clutch-pedal by a set-screw 23, with which the correspondingly inclined face of the arm 20 makes contact. By this means the clutch-pedal is moved to neutral position before the brake-lever has reached a braking position, the brake being set as the auxiliary pedal moves still further downwardly. It is of course immaterial whether the cam 22 be an attached part, or integral with the clutch-pedal, except for adjustment to exact position, when a movable cam is preferable.

At the forward end of the bearing member 17 is pivoted a latch 24, thrown to latching position by a spring 25. This latch catches and holds the auxiliary pedal in the neutral position shown in Fig. 1. There is now no possibility of the clutch-pedal backing into high gear position, with its attendant dangers. It will be evident, also, that the neutral condition is reached positively, and with no conscious effort on the part of the driver, before the brake can be set, and thus there is no danger of stalling the engine. When the auxiliary pedal is not used as a driving pedal, the driver then operates the regular pedals as usual, and without regard to the auxiliary pedal.

Provision is made for releasing the auxiliary pedal from its locked position. This is done by simply pressing the clutch pedal forwardly, to the "low" position, when the shank of said pedal engages a cam tail-piece 26 of the latch, disengaging it. A tension spring 27 restores the auxiliary lever to its initial position.

In the absence of any controlling or modifying mechanism, this would of course permit the original pedals to be operated in all respects as though there were no auxiliary apparatus. It is desirable, however, to be able to positively set the auxiliary pedal in the neutral position, and hold it there indefinitely, regardless of the releasing action above described. In tight places even an experienced driver will sometimes inadvertently lose control of the clutch-lever, which automatically drops back to the high-speed position, and sometimes with disastrous results. Provision is therefore made for locking the auxiliary lever in neutral so that the forward movement of the clutch pedal does not release it. This supplemental lock will now be described.

Referring to Fig. 1 it will be seen that the rear end of the auxiliary pedal arm is formed as a hook 28; with an angular opening 29 and an inclined nose 30. Directly behind the opening 29 in Fig. 1, is an inclined socket 31 forming a guide and keeper for a bolt 32, inclined at 33, with its upper end projecting up through the foot-board of the car. A curved spring 34, under a cross-pin 35, tends to hold the bolt upwardly when not needed. It is pushed downwardly by the toe of the operator. Near the lower end of the bolt are two lateral shoulders, 36 and 37. When the bolt is fully depressed the former engages the angular opening, and positively locks the auxiliary pedal in neutral. When partially depressed the shoulder 37 so engages, and the auxiliary lever may then retreat to the "high" position. When fully elevated, as shown in Fig. 3, the shoulder 37 abuts against the inner side of the auxiliary lever, and the bolt itself is locked in "high" position. In the event of any sticking of the bolt, it is forced positively to initial position by thrusting the auxiliary lever to its extreme forward position, and by the engagement of the shoulder 37 with the inclined nose 30.

Assuming now that the driver is in close quarters, and must advance and retire slowly and with caution. With one foot he pushes the auxiliary lever to neutral, and with the other foot depresses the lock-bolt. When slightly past the position shown in Fig. 1 the lock-bolt engages. He may now operate the clutch-pedal as far as it will go, forward or back, and may alternately operate the reverse-pedal, with no danger of shifting accidentally into "high" and plunging suddenly forward. When clear of obstructions, and he is ready to go ahead, he has only to push the auxiliary lever well forward, when the lock-bolt automatically releases, and the action of the various controls may proceed as though it were not present.

Having thus described my invention, I claim:

1. In combination with the clutch-pedal and brake-pedal of a motor vehicle, an auxiliary pedal, a rock-shaft to which it is attached, and arms projecting from said shaft to engage the rear of the clutch and brake-pedals, respectively, and push the one to neutral, and the other to braking position.

2. In combination with the clutch-pedal and brake-pedal of a motor-vehicle, an auxiliary pedal, a rock-shaft to which it is attached, and arms disposed on said shaft progressively, to engage successively the clutch-pedal and the brake-pedal.

3. In combination with the clutch-pedal and brake-pedal of a motor-vehicle, an auxiliary pedal, a rock-shaft to which it is attached, progressively disposed arms on said shaft to engage the clutch and brake-pedals and advance the former faster than the latter, and means to restore the auxiliary pedal to initial position.

4. In combination with the clutch-pedal and brake-pedal of a motor-vehicle, an auxiliary pedal, a rock-shaft to which it is attached, pushing arms projecting from the rock-shaft to engage the clutch-pedal and brake-pedal and push them successively to neutral and braking positions, and a lock to hold the auxiliary lever in neutral position.

5. In combination with the clutch-pedal and brake-pedal of a motor-vehicle, an auxiliary pedal, push-levers thereon to engage the clutch-pedal and the brake-pedal, respectively, and a lock-member to hold the auxiliary pedal in neutral position, said member having an extension in the path of the clutch-pedal, by the forward movement of which pedal the lock is disengaged.

6. In combination with the clutch-pedal and brake-pedal of a motor vehicle, a rock-shaft mounted rearwardly thereof, an operating pedal for said shaft, arms of unequal length projecting from the shaft to engage the clutch-pedal and brake-pedal respectively, the longer, clutch-pedal arm having an inclined face, and the clutch-pedal having a coinciding cam, whereby the clutch-pedal is advanced farther in proportion than the brake-pedal.

7. In combination with the control pedals of a motor-vehicle, an auxiliary pedal and connected mechanism to throw said controls to neutral and braking position, successively, a lock to hold the auxiliary pedal in neutral position, said lock being releasable by the movement of one of said controls, and a supplemental lock adapted to prevent such release.

8. Combined with the control pedals of a motor vehicle, an auxiliary pedal and connected mechanism to throw said controls to neutral and braking position, successively, a lock to hold the auxiliary pedal in neutral position, said lock being releasable by the movement of one of said controls, and a supplemental lock, moved to locking position by the operator, to prevent said release, and means to automatically restore the supplemental lock to normal position.

9. Combined with the control pedals of a motor vehicle, an auxiliary pedal and connected mechanism to throw said controls to neutral and braking position, respectively, and a lock to hold the auxiliary pedal in neutral and "high" position, said lock being self-releasable by an advance movement of the auxiliary pedal.

10. Combined with the controls of a motor vehicle, an auxiliary pedal and connected means to throw the controls successively to neutral and braking position, and a lock to hold said pedal in neutral and "high" position, the lock being self-releasable by an extreme movement of the pedal, and being itself locked against movement when both itself and the pedal are in normal position.

11. Combined with the controls of a motor vehicle, an auxiliary pedal and connected means to move the controls to neutral and braking position, and a lock to hold said pedal in neutral position, the same comprising a diagonally sliding bolt, a guide therefor, and restoring means, and a recessed portion of said pedal to receive the end of the bolt when in such neutral position, the adjacent side of the pedal forming an abutment for the bolt when in normal position.

12. Combined with a control pedal of an automobile, an auxiliary pedal and push-lever adapted to force the control pedal to neutral position, and an attachable and adjustable cam for the control pedal to engage said push-lever.

13. Combined with the transmission and controls of a motor vehicle, an auxiliary pedal, a rock-shaft to which it is attached, a bearing therefor attachable to one of the sills of the vehicle, and a double bearing for the other end of the shaft, the base for said double bearing being bored to coincide with the screw-holes in the top-plate of the transmission case.

14. Combined with the rock-shaft of an auxiliary control pedal for motor vehicles, a bearing attachable to the transmission case, and another bearing attachable to one of the sills of the motor vehicle, the sill bearing having a foot extending downwardly the thickness of the adjacent sill web, and a clamping bolt, one side of whose head rests against said foot, and the other against the sill web.

In testimony whereof I affix my signature in presence of two witnesses.

FRANK W. NORTON.

Witnesses:
F. W. ARMSTRONG,
J. M. ST. JOHN.